United States Patent [19]

Grützmann et al.

[11] 3,869,670

[45] Mar. 4, 1975

[54] ARRANGEMENT FOR CARRYING SIGNALS

[75] Inventors: Sigmar Grützmann; Heinz Sailer, both of Munich; Gero Schollmeier, Gauting, all of Germany

[73] Assignee: Siemens Aktiengesellschaft, Berlin and Munich, Germany

[22] Filed: May 14, 1973

[21] Appl. No.: 359,893

[30] Foreign Application Priority Data

May 16, 1972 Germany .......................... 2223842

[52] U.S. Cl. .......... 325/38 A, 178/68, 340/347 AD, 340/347 DD

[51] Int. Cl. .......................................... H03k 13/22

[58] Field of Search ............... 325/38 A; 179/15.55; 178/68; 340/347 AD, 347 DA, 347 DD

[56] References Cited

UNITED STATES PATENTS

| | | | |
|---|---|---|---|
| 2,832,827 | 4/1958 | Metzger | 178/68 |
| 3,388,330 | 6/1968 | Kretzmer | 325/38 A |
| 3,492,578 | 1/1970 | Gerrish et al. | 325/38 A |
| 3,560,856 | 2/1971 | Kaneko | 325/38 A |
| 3,573,622 | 4/1971 | Holzman et al. | 325/38 A |
| 3,716,789 | 2/1973 | Brown et al. | 325/38 A |

*Primary Examiner*—Malcolm A. Morrison
*Assistant Examiner*—Errol A. Krass

[57] ABSTRACT

A circuit arrangement for transmitting amplitude modulated signals which assume a plurality of amplitude levels is described. These signals are converted by means of a coder network and a signal shaper into a composite signal constituted by a plurality of partial response pulses. The signal, so transmitted, is sampled at the end of each clock period.

The amplitude modulated signal is multiplied with a sign signal, which can assume either of two values. The product of the latter multiplication will assume an amplitude corresponding to that of the amplitude modulated signal, but having a polarity corresponding to the value of the sign signal. A differential amplifier produces from the foregoing product a differential signal, the amplitude of which equals the difference between the values of a first auxiliary signal and a second auxiliary signal. A delay network delays the differential signal by two system clock periods. The sign signal is derived from the differential signal. The multiplication or delayed differential signals form the first or second auxiliary signals. The differential signal is, as well, supplied to a subsequent signal shaper.

5 Claims, 7 Drawing Figures

ARRANGEMENT FOR CARRYING SIGNALS

BACKGROUND OF THE INVENTION

This invention relates to an arrangement for transmission of an amplitude-modulated signal which assumes a plurality of amplitude levels, said signal being converted into a composite signal comprising partial-response pulses by means of a coder network and a signal shaper. The composite signal is scanned at the receiver after completion of each clock period.

According to a prior art method for transmitting a signal using partial-response pulses, prior coding is necessary so as to be able to recognize the received characters from the individual scanning values of the transmitted composite signal. As is generally known, such prior coding may be effected by means of a modulo-L-addition, where L is the number of steps or levels required for the transmission. Additional amplitude levels as a result of the superposition of a plurality of pulses occurring during the transmission of partial-response pulses, with the frequency of occurrence of said amplitude levels rapidly increasing to comparatively high absolute values. Thus, the various amplitude levels do not occur with the same frequency. With a specified permissible peak power on the transmission line, this leads to a comparatively low mean transmitted power. A further disadvantage of this conventional prior coding arrangement lies in the fact that controls are made difficult because the maximum amplitude levels occur infrequently.

An object of the invention is, therefore, to provide an arrangement of the type discussed hereinabove, through the use of which the aforementioned disadvantages of prior coding, as known in the art, are avoided.

SUMMARY OF THE INVENTION

In accordance with the invention, the foregoing and other objects are achieved in that in the arrangement referenced above there is provided a multiplier circuit, to which are routed the amplitude-modulated signal and a sign signal assuming two values. The multiplier supplies a multiplication signal over the output thereof, which has an amplitude with the first or with the second value of the sign signal equal to the amplitude of the signal or the negative value of the amplitude of the signal.

A differential amplifier is provided for supplying a differential signal, the amplitude of which equals the difference between a first and a second auxiliary signal. Moreover, a delay network is provided which delays the differential signal supplied thereto by two clock periods and which provides a delayed signal. The multiplication signal or the delayed differential signal is routed to the differential amplifier as a first or a second auxiliary signal, the differential signal being supplied to the signal shaper.

The arrangement according to the invention is characterized by the fact that the individual amplitude levels differing from the zero amplitude level occur with the same frequency, so that a relatively high mean power is transmitted over the transmission line. A further advantage of the arrangement according to the invention resides in the fact that level controls at the receiver are simplified, because the maximum amplitude steps occur more frequently than if precoders of known construction are employed.

To carry out the coding of the transmitted composite signal through rectification, it is convenient to route the differential signal supplied by the coder to a signal shaper, of known construction, which allocates a partial-response pulse to each amplitude level of the differential signal and which through addition of all partial-response pulses produces a composite signal. From the composite signal the decoded amplitude levels are established with little technical expenditure, through rectification.

To better process the differential signal supplied by the coder in the subsequently connected signal shaper, it is convenient to route the differential signal to an analog-to-digital converter, which supplies a binary signal in accordance with each amplitude level to the signal shaper via a plurality of output lines. In so doing, it is convenient to connect the output lines to the inputs of an adding circuit and to supply the output signal to the adding circuit instead of the differential signal to the delay circuit.

In order to carry out with comparatively little expenditure for apparatus the delay of the differential signal by two clock periods, it is convenient to provide as delay circuit two series-connected flip-flop circuits and to take from the output of the second circuit the negated differential signal delayed by two timing periods.

The differential amplifier and the multiplier circuit can be implemented with comparatively little expenditure for components by means of gate circuits, to which are routed the negated and delayed differential signal and binary signals corresponding to the individual amplitude levels.

BRIEF DESCRIPTION OF THE DRAWINGS

The principles of the invention will be more readily understood by reference to the description of preferred embodiments of the invention, constructed according to those principles, given hereinbelow in connection with the drawings, where in the several views like reference letters and numerals denote like parts.

DETAILED DESCRIPTION OF THE DRAWINGS

Figure 1:
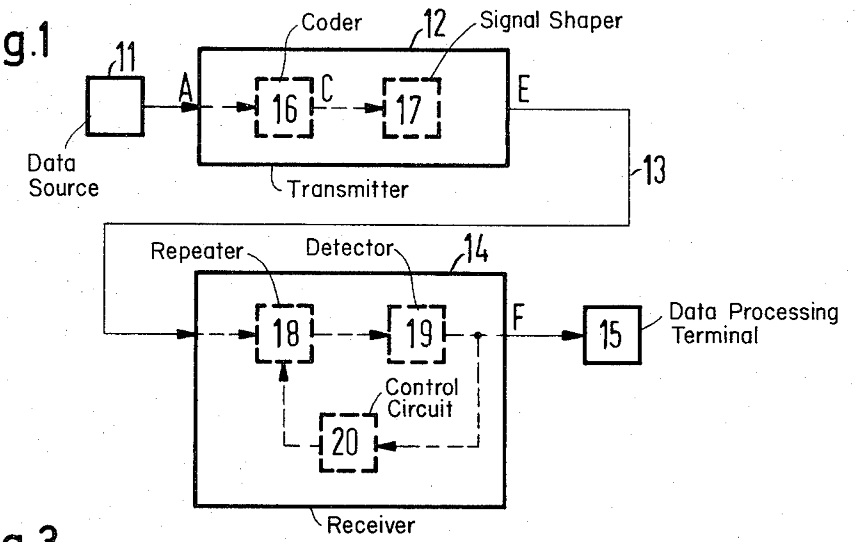
FIG. 1 is a block-schematic diagram of an arrangement for transmitting signals in accordance with the invention.
Figure 2:
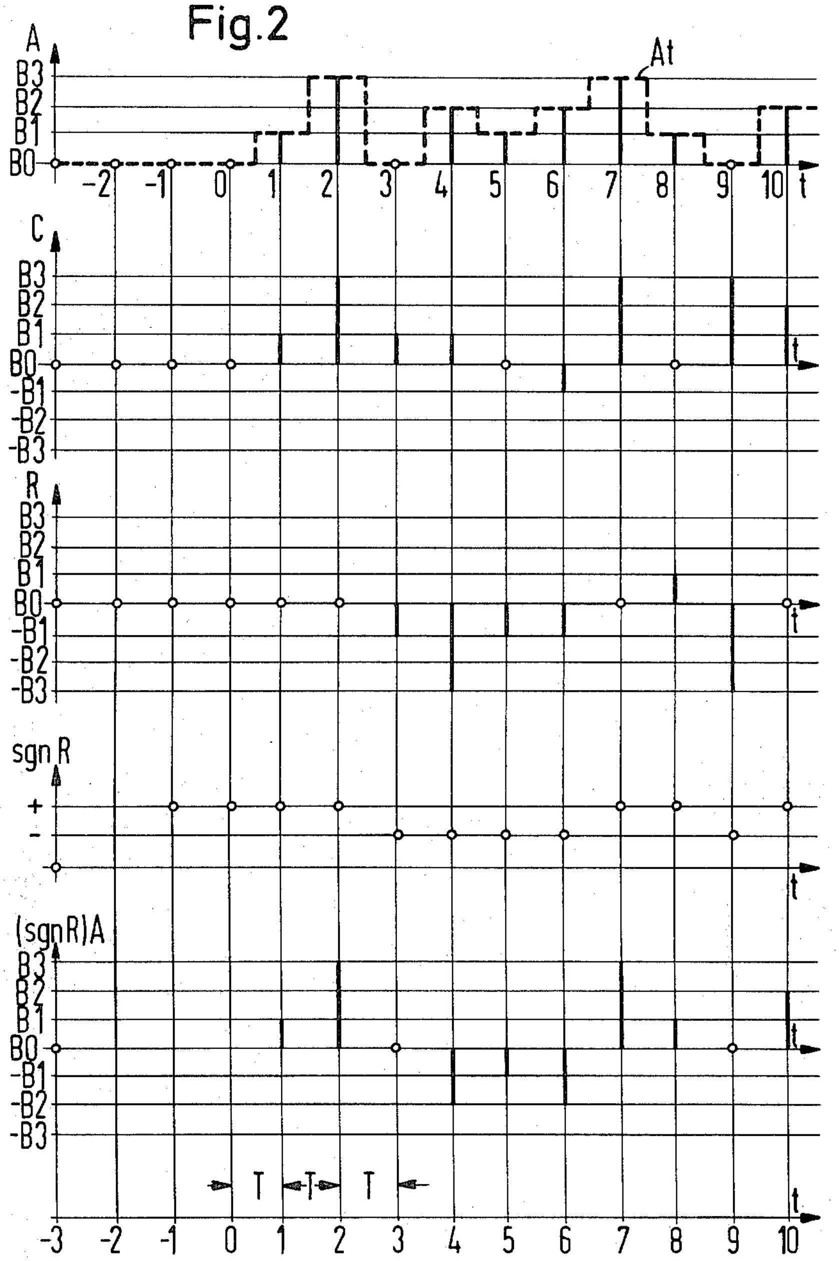
FIG. 2 are timing diagrams detailing the precoding according to the invention.

FIG. 1 shown a source 11 which in the conventional manner generates an amplitude-modulated signal A to be transmitted. The signal A is shown in FIG. 2 in broken line and has a plurality of amplitude steps B0, B1, B2 and B3. By way of example, signal A can be realized by superimposing a plurality of binary signals, one over the other.

Signal A is converted into a composite signal E by means of a data transmitter 12, the signal being transmitted over line 13. Space transmission may be used instead of line 13. In the majority of cases, however, a telephone line is provided as line 13, and this makes possible the transfer of data within the voice frequency band of 300 to 3,400 Hz. Generally, a conventional modulator and a conventional demodulator are required for transmitting the composite signal E (not shown in FIG. 1 in the interest of clarity).

Composite signal E transmitted over line 13 is comprised of partial-response pulses superimposed on each other, every one of which is allocated to the individual amplitude levels of signal A.

Composite signal E is received with a data transmission receiver 14, of known construction, and the receiver signal F is derived. The amplitude levels of the receiver signal correspond at the sampling instants with the amplitude levels of signal A. The receiver signal F is routed to data processing terminal equipment 15. The latter processing equipment plays no part in the carrying out of the invention, and is, therefore, not described in detail herein. It is to be understood that any suitable processing apparatus can be used and will be selected in accordance with the particular data to be processed and the particular application.

The data transmitter 12 contains a coding means 16 and a signal shaper 17, details of which will be given hereinbelow. The data transmission receiver 14 contains a repeater 18, a detector 19 and the control circuit 20, which causes a gain control, in the known manner, of the repeater 18. By way of example, a teletypewriter may be used as a data processing terminal equipment.

FIG. 2 illustrates signals and amplitude levels which are of significance in connection with the data transmission of partial-response pulses. Units of the time $t$ are plotted in the direction of the abscissas and units of the amplitudes are plotted in the direction of the ordinates.

Signal A with the amplitude steps B0, B1, B2 and B3 are generated by the source 11 shown in FIG. 1. Sampling is carried out at the instants $t=-3$, $t=-2$, $t=-1$, $t=0$, $t=1$, . . . . . . . $t=10$.

In FIG. 2, amplitude levels of signal C are plotted below signal A. The invention is based on the knowledge that the amplitude levels of signal C can be shown by the following equation:

$$C = (\text{sgn } R)A - R,$$

where: sgn R is the algebraic sign of the signal

A is the amplitude of signal A

R is the amplitude of signal R.

Signal R constitutes the signal rests of reversed polarity, the maximum amplitudes of which occur two scanning periods T after the particular amplitude steps of signal C. By way of example, the signal R occurring at the time interval t = 3 has the amplitude step -B1, whereas the corresponding signal C appearing at time interval t = 1 assumes the amplitude step B1. Thus, the signal R has an amplitude step opposite that of the signal C and is displaced by two timing periods T in the direction of the positive t-axis.

The fourth diagram shown in FIG. 2 relates to the expression sgnR. As mentioned hereinabove, this is an expression that characterizes the algebriac sign of the signal R.

The last diagram in FIG. 2 relates to the expression (sgnR)A. This expression equals the product of the expression sgnR multiplied by the amplitude of signal A.

When deriving signal C, it is first assumed that at the instants $t=-3$, $t=-2$, $t=-1$, $t=0$, the signals A and C occupy the amplitude level B0. Under this premise, the signal R, too, occupies the amplitude B0 at the instants $t=-1$, $t=0$, $t=1$, $t=2$. This results in the positive algebriac signs of the signal sgnR at the same instants $t=-1$, $t=0$, $t=1$ and $t=2$. Thus, at the time interval $t=1$, the amplitude level B1 of the signal (sgnR)A is obtained and also the amplitude level B1 of the signal C, since at the time intervals $t=1$ the signal R assumes the amplitude step B0. In like manner, the signals (sgnR)A and C can be determined at the time interval $t=2$. The signals R at the time intervals $t=3$ and $t=4$ can be determined from the signal C at the time intervals $t=1$ and $t=2$. All the amplitude levels of the signal C can be determined in like manner.

Figure 3:
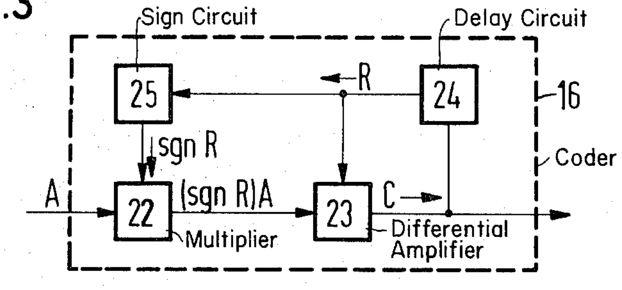
FIG. 3 is a block-schematic diagram of a preferred embodiment of a coding means for use in the FIG. 1 embodiment.

FIG. 3 shows in greater detail the diagrammatically illustrated coding means 16 of FIG. 1. This coding means 16 comprises multiplier circuit 22, differential amplifier 23, the delay circuit 24 and the sign circuit 25. Each of the latter components are of known construction and further structural description of them is not given herein. The signal A is routed to the multiplier circuit 22, and the sign signal is fed to the sign circuit. The sign signal is capable of taking a first and a second value. If the sign signal takes a first value, a multiplication signal is generated over the output of the multiplier circuit 22, the amplitude of which equals the amplitude of the signal A. If the sign signal takes a second value, a multiplication signal is produced over the output of the multiplier circuit 22, the amplitude of which equals the negative value of the amplitude of the signal A. Since the sign signal sgnR is generated in the sign circuit 25 in dependence upon the algebriac sign of the signal R, the multiplication signal generated by the multiplier circuit 22 corresponds to the expression (sgnR)A.

The difference between the multiplication signal (sngR)A and the signal R is formed with the differential amplifier 23. Thus, the signal C is generated from the output of the difference circuit 23.

The signal C is transmitted to the signal shaper 17 shown in FIG. 1 and to the delay circuit 24 illustrated in FIG. 3. The delay circuit 24 causes the delay of the signal C by two clock cycles T and a reversal of the polarity. Thus, the signal R is supplied from the output of the delay circuit 24.

Figure 4:
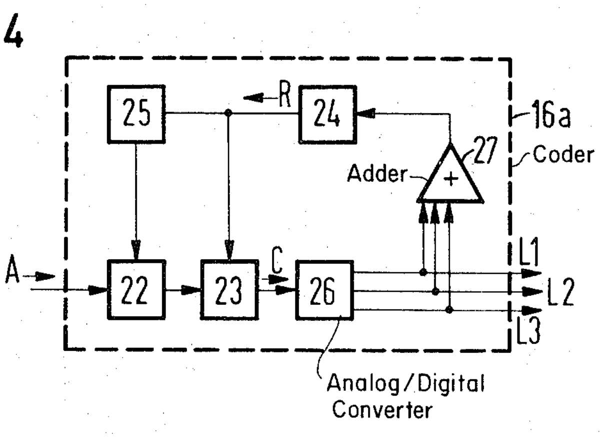
FIG. 4 is a block-schematic diagram of an alternate preferred embodiment of a coding means supplying differential signals in binary form.

FIG. 4 illustrates a coding means 16a which is an alternate preferred embodiment of the coding means 16 illustrated schematically in FIG. 1. In addition to the components mentioned with reference to FIG. 3, the coding means 16a contains the analog to digital converter 26 and the adding circuit 27. In the present embodiment, the signal C can occupy a total of seven amplitude levels. Binary signals are transmitted over the lines L1, L2 and L3, which identify separately and jointly every one of the seven amplitude levels. If, for example, the bits 001 are transferred over the lines L3, L2 and L1, the signal C assumes the amplitude step B0. If the bits 100 are transferred over the lines L3, L2 and L1, the signal C assumes the amplitude step B3. This analog to digital conversion of the signal C is advantageous for the subsequent processing of the signal, as will be described with reference to FIG. 5.

Figure 5:
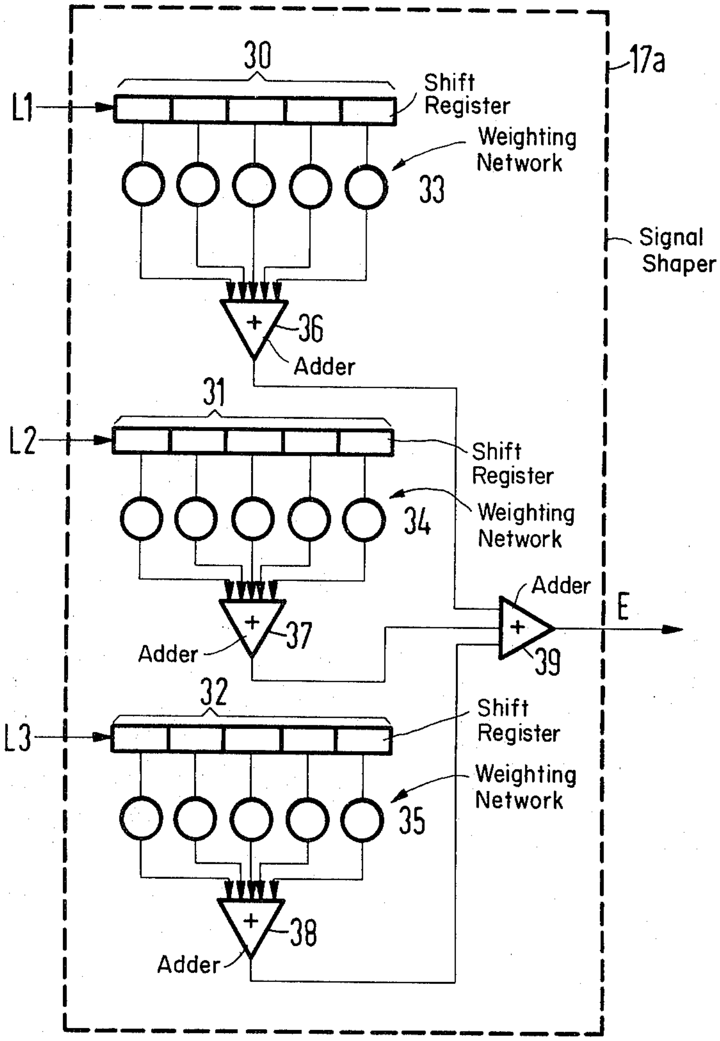
FIG. 5 is a schematic diagram of a signal shaper for use in the FIG. 1 embodiment.

FIG. 5 shows the signal shaper 17a as a preferred embodiment of the signal shaper 17 illustrated schematically in FIG. 1. The pulse shaper 17*a* comprises the shift registers 30, 31, 32, the interpreting members 33, 34, 35, and the adding circuits 36, 37, 38, 39. The shift registers 30, 31, 32 comprise a plurality of bistable circuits. In the illustrated embodiment only five bistable circuits per shift register are shown in the interest of clarity. Obviously, any desired number can be used. The data concerning the amplitude levels of the signal C are routed to the shift registers 30, 31 or 32 over the lines L1, L2 or L3, said data being shifted serially into the shift registers at the scanning instants t.

At the output of each bistable circuit, the interpreting members 33 or 34 or 35 are connected to the inputs of the adding circuits 36 or 37 or 38. By way of example, resistors may be provided as interpreting members, which cause a different interpretation of the binary signals routed over the lines L1, L2, L3. The outputs of the adding circuits 36, 37, 38 are coupled to the adding circuit 39, which provides the signal E.

Figure 6:
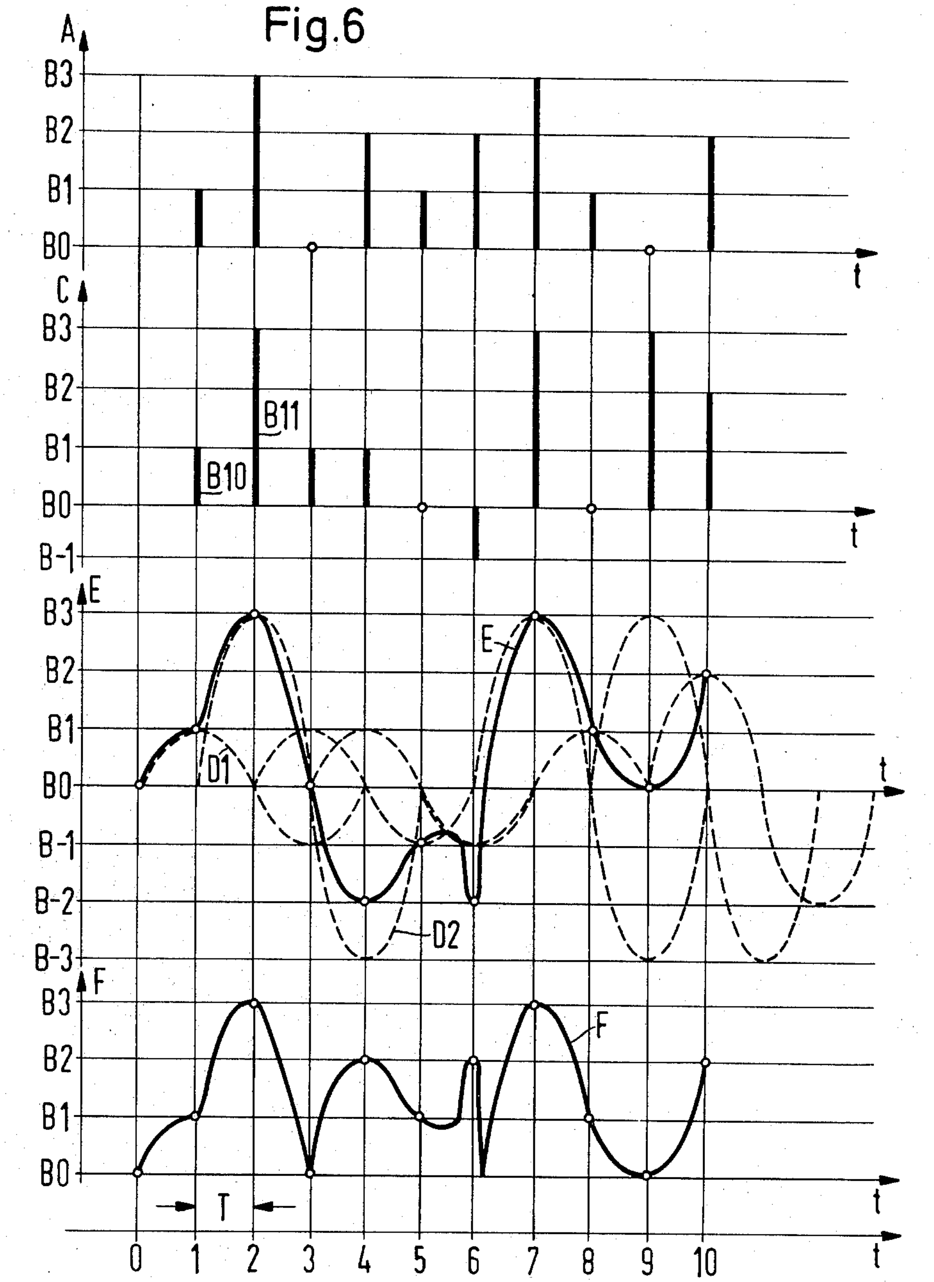
FIG. 6 are timing diagrams illustrating the operations of the inventive arrangement.

FIG. 6 shows various diagrams detailing the operation of the signal shaper 17a. Units of the time interval *t* are plotted in the direction of abscissas in spaced relation to the scanning period T. Units of the amplitudes are plotted in the direction of ordinates. On the top of FIG. 6, the signal A is shown in the same manner as in FIG. 2, but with enlarged amplitude levels B0 to B3. The signal C is shown therebelow, likewise with enlarged amplitude levels. In order to obtain signal E, a signal D is allocated to each amplitude level of the signal C, the formula for which is as follows:

$$D(t)=\frac{\sin\frac{\pi t}{T}}{\left(\frac{\pi t}{T}\right)^2-\pi^2}C$$

where D($t$) is the value of signal D at the interval of time $t$ $t$ = instants of scanning T = clock period By way of example, the signal D1 is assigned to the amplitude level B10 of the signal C occurring at the interval of time $t$=1 or $t$=3. In like manner, signal CE2 is allocated to the amplitude step B11 of the signal. In FIG. 6, the jointly assigned signals D are shown in broken line. Adding the signals D produces the signal E, which is shown in solid line. The signal E is transmitted to the data transmission receiver 14 over the line 13 shown in FIG. 1, amplified in repeater 18 and detected by means of the detector, e.g., a rectifier, 19. The signal F shown at the bottom of FIG. 6 is supplied from the output of the detector 19, which signal faithfully reproduces the individual amplitude levels B0, B1, B2, B3 of the transmitted signal A at the instants t. The decoding of the transmitted signal E is thus carried out simply by means of the receiver 14.

This type of decoding has the further advantage that by changing the polarity of the signal supplied by the repeater 18, caused, for example, by a demodulation of a single-sideband amplitude-modulated signal with a carrier displaced in phase by 180°, the correct decoding is not impaired. It is likewise apparent from FIG. 6 that the absolute values of the amplitude steps of the signal A, to be transmitted, and of the transmitted signal E are equal. Hence, the high amplitude levels of the transmitted signal E occur as frequently as the high amplitude levels of the signal A to be carried. The comparatively frequent occurrence of the large amplitude levels has its advantageous effects when controlling the amplitude of the signals E and F, for example, by means of the control circuit 20 and of the repeater 18 shown in FIG. 1.

Figure 7:
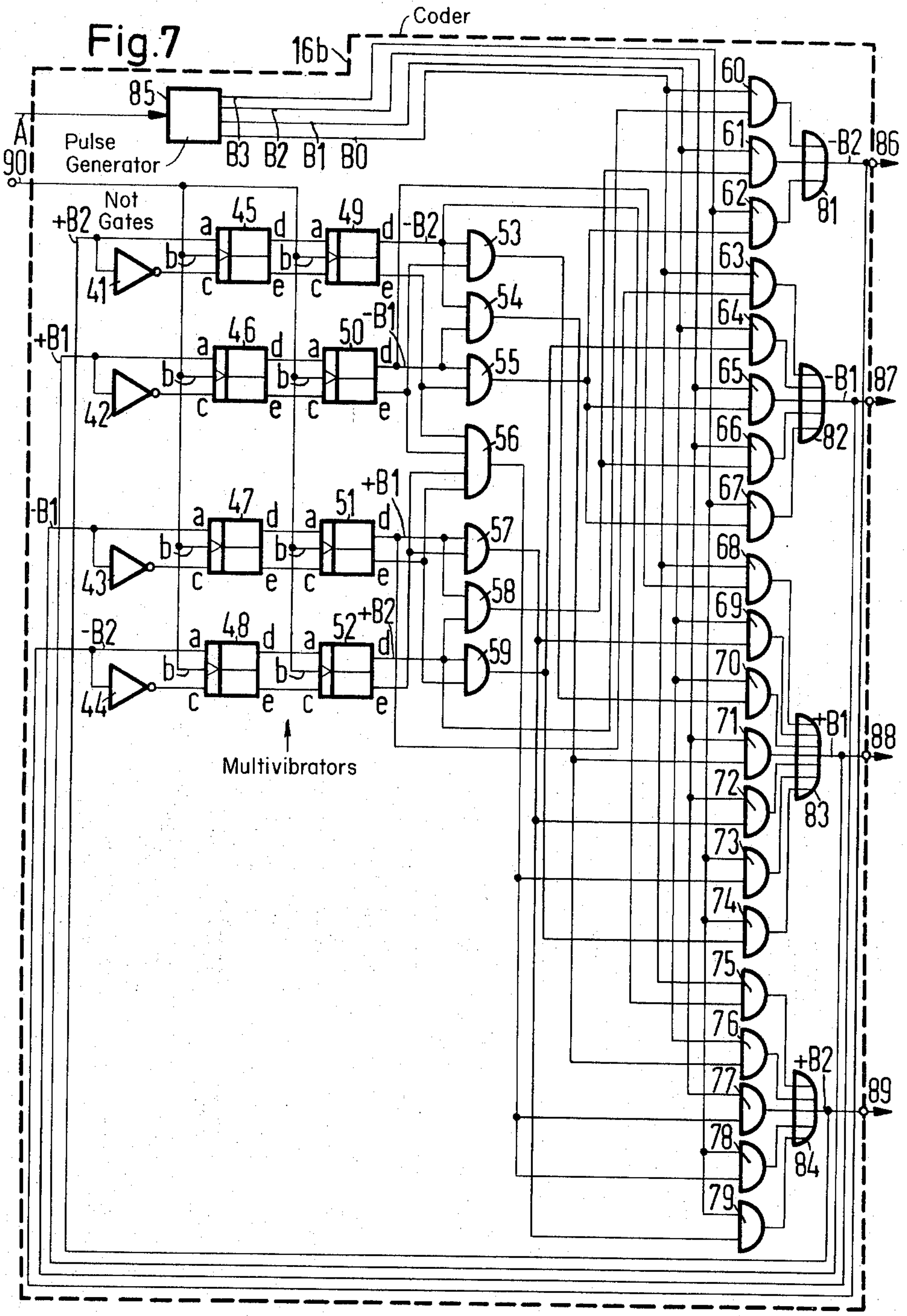
FIG. 7 is a schematic diagram of a further preferred embodiment of a coding means shown in greater detail.

FIG. 7 illustrates a further coding means 16b as an alternate preferred embodiment of the schematically illustrated coding means 16 of FIG. 1. The coding means 16b comprises the NOT elements 41 – 44, multivibrators 45 – 52 AND gates 53 – 79, OR gates 81 – 84, and the pulse generator 85.

The signal A to be transmitted is routed to the pulse generator 85, which provides binary signals over four outputs, each of which is allocated to a one of the amplitude levels B0, B1, B2 and B3, For example, a value 1 is provided over the output marked B3 only if the signal A momentarily assumes the amplitude level B3.

The multivibrators 45 – 52 can each have two stable states, of which one state is called the "zero state" and the other state the "one state." These multivibrators have inputs *a, b, c* and outputs *d, e.* Clock pulses are routed over terminal 90 and appear at the instants $t$=$o$, 1, 2, 3, etc. During the zero state, the inputs $a$ = 0, $c$ = 1, and the outputs $d$ = 0 and $e$ = 1 appear. During the one state of the multivibrators, the inputs $a$ = 1 and $c$ = 0, and the outputs $c$ = 1 and $e$ = 0 occur.

The transition from the zero state to the one state takes place with the subsequent positive edge of the clock pulses routed over the terminal 90 and over the inputs if, in addition, $a$ = 1 and $c$ = 0. The transition from one state to the zero state occurs with the subsequent positive edge of the clock pulses if at the same time the inputs $a$ = 0 and $c$ = 1.

As shown in FIG. 2, the signal C can assume a total of seven amplitude levels, –B3, –B2, –B1, B0, B1, B2 and B3. The lines 86, 87, 88 or 89 shown in FIG. 7 are assigned to the four amplitude levels –B2, –B1, +B1 or +B2. The remaining three amplitude levels are formed by combining the signals of several lines. For example, a signal can be formed by values on the lines 87 and 88, in accordance with the amplitude level B0.

The lines 86 to 89 correspond to the output line shown in FIG. 3, over which the signal C is supplied. These lines are successively connected to the inputs a of the multivibrators 45 – 48. The multivibrators 45 – 48 cause a delay of the signals routed at the beginning by one clock period T, and the multivibrators 49 – 52 cause a further delay by one clock period T. The multivibrators 45 – 52 thus correspond to the delay circuit 24 shown in FIG. 3.

In addition, these multivibrators cause a reversal of the polarity of the signals fed at the beginning and take over the function of the sign circuit 25 illustrated in FIG. 3. For example, a signal in accordance with the amplitude step –B2 is sent from the line 86 to the input a of the multivibrator 48, and after two clock period, a signal in accordance with the amplitude level +B2 is supplied from output d of the multivibrator 52.

The AND gates 60 – 79 and the OR gates 81 to 84 take over the function of the multiplier circuit 22 and the differentiating circuit 23 shown in FIG. 3. If, for example, a one signal is sent from the pulse discriminator 85 over the output B0, which signal indicates the amplitude level B0, then a one signal (which indicates the amplitude level −B2) is sent over the line 86 only if a one signal in accordance with the amplitude step +B2 is concurrently routed to the AND gate 60 over the output d of the multivibrator 52.

The lines 86, 87, 88 and 89 are connected to a signal shaper having the same construction as the signal shaper 17*a* of FIG. 5. However, such a signal shaper must have more than three inputs L1, L2, L3. Four inputs, as well as suitable shift registers and weighting networks are required in order that every one of the lines 86 or 87 or 88 or 89 can be connected to every one of said inputs of the signal shaper.

The preferred embodiments described hereinabove are intended only to be exemplary of the principles of the invention. It is contemplated that the described embodiments can be changed or modified in various ways, obvious to those skilled in the art, while remaining within the scope of the invention, as defined by the appended claims.

We claim:

1. A circuit arrangement for transmitting amplitude-modulated signals capable of assuming a plurality of amplitude levels, said circuit arrangement including coding means and signal shaping means for forming, from said amplitude modulated signals, a composite signal comprising a plurality of partial response pulses, said composite signal being periodically sampled at a receiver at the end of each system clock period, said circuit arrangement comprising;

converter means including multiplier means for multiplying said amplitude modulated signal with a sign signal, said sign signal being capable of assuming one of two values, for providing a product signal which has an amplitude equal to that of the amplitude modulated signal and a polarity corresponding to the value of the sign signal, difference means for receiving said product signal and producing therefrom a differential signal, the amplitude of which corresponds to the difference between the values of first and second signals, delay means for receiving said differential signal and delaying same by a period corresponding to at least two periods of the system clock, means for deriving said sign signal from said delayed differential signal and for coupling said sign signal to said multiplier means, means for routing said multiplication signal and said delayed differential signal to said difference means as said first and second signals and means for coupling said differential signal to said signal shaping means for producing said composite signal for transmission.

2. The circuit arrangement defined in claim 1 further comprising:

analog to digital converter means for receiving said differential signal and producing a plurality of binary signals corresponding to the amplitude levels of said differential signal, said binary signals being coupled in parallel to said signal shaper and first adder means for receiving said binary signals in parallel and for producing therefrom a sum signal which is coupled to the input of said delay means.

3. The circuit arrangement defined in claim 1 wherein said signal shaper comprises:

a plurality of shift registers, a plurality of weighting networks, each weighting network having inputs connected to each stage of a said shift register and a corresponding number of outputs, a plurality of second adder means, each said adder means having inputs coupled to the outputs of a said weighting network, and third adder means for receiving the outputs of said plurality of second adder means for producing the composite signal therefrom.

4. The circuit arrangement defined in claim 1 wherein said delay means comprises at least two series-connected multivibrators.

5. The circuit arrangement defined in claim 4 wherein said converter means comprises:

pluse generator means for receiving said amplitude modulated signal and producing therefrom a plurality of parallel binary signals corresponding to the amplitude levels present in said amplitude modulated signal and wherein said differentiating means comprises:

logic gate means for producing outputs in accordance with a predetermined logic from the outputs of said pulse generator means and the output of the second of said two multivibrators.

* * * * *